US012003918B2

(12) United States Patent
Kobayashi et al.

(10) Patent No.: US 12,003,918 B2
(45) Date of Patent: Jun. 4, 2024

(54) ELECTRONIC MUSICAL INSTRUMENT AND ELECTRONIC KEYBOARD INSTRUMENT

(71) Applicant: CASIO COMPUTER CO., LTD., Tokyo (JP)

(72) Inventors: Ryohei Kobayashi, Akishima (JP); Hiroki Akai, Hino (JP); Teruo Jinbo, Fussa (JP); Kouji Oshima, Fussa (JP); Shingo Fukushima, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 621 days.

(21) Appl. No.: 17/200,724

(22) Filed: Mar. 12, 2021

(65) Prior Publication Data

US 2021/0297767 A1 Sep. 23, 2021

(30) Foreign Application Priority Data

Mar. 17, 2020 (JP) ................................ 2020-046813
Mar. 17, 2020 (JP) ................................ 2020-046814

(51) Int. Cl.
*H04R 1/28* (2006.01)
*G10H 1/34* (2006.01)
(Continued)

(52) U.S. Cl.
CPC ........... *H04R 1/2826* (2013.01); *G10H 1/344* (2013.01); *H04R 1/025* (2013.01); *H04R 1/2834* (2013.01);
(Continued)

(58) Field of Classification Search
CPC .... H04R 1/2826; H04R 1/025; H04R 1/2834; H04R 1/403; H04R 3/12; G10H 1/344; G10H 2220/221
(Continued)

(56) References Cited

U.S. PATENT DOCUMENTS 7,692,089 B2 * 4/2010 Nishida .................... G10H 1/32 84/719
8,193,438 B2 * 6/2012 Hoshino .................. G10H 1/32 84/718
(Continued)

FOREIGN PATENT DOCUMENTS

JP H04241395 A * 8/1992
JP H04241395 A 8/1992
(Continued)

OTHER PUBLICATIONS

Japanese Office Action dated May 24, 2022 (and English translation thereof) issued in counterpart JP Application No. 2020-046813.
(Continued)

*Primary Examiner* — Christina M Schreiber
(74) *Attorney, Agent, or Firm* — Holtz, Holtz & Volek PC

(57) ABSTRACT

An electronic musical instrument according to one embodiment of the present disclosure includes a loudspeaker which releases sounds in a first direction in accordance with an instrument playing operation, an internal component which includes a substrate, a case which houses the loudspeaker and the internal component and has a first region which faces a rear face of the loudspeaker and a second region which faces a rear face of the internal component and does not face the rear face of the loudspeaker, and a sound releasing member which is disposed on an installation face side and in the second region, and releases acoustics in an acoustic space which is formed around the loudspeaker in a second direction which is opposite to the first direction.

20 Claims, 9 Drawing Sheets

(51) Int. Cl.
*H04R 1/02* (2006.01)
*H04R 1/40* (2006.01)
*H04R 3/12* (2006.01)

(52) U.S. Cl.
CPC ............... *H04R 1/403* (2013.01); *H04R 3/12* (2013.01); *G10H 2220/221* (2013.01)

(58) Field of Classification Search
USPC ........................................................... 84/644
See application file for complete search history.

(56) References Cited

U.S. PATENT DOCUMENTS

| | | | | | |
|---|---|---|---|---|---|
| 10,200,784 | B2 * | 2/2019 | Yamazaki | H04R 1/2888 | |
| 10,249,277 | B2 * | 4/2019 | Hoshino | G10H 1/32 | |
| 2001/0052284 | A1 * | 12/2001 | Kondo | G10H 1/32 | 84/718 |
| 2010/0154615 | A1 * | 6/2010 | Shinjo | G10H 1/32 | 84/177 |
| 2016/0295316 | A1 * | 10/2016 | Shao | H04R 1/2826 | |
| 2017/0206878 | A1 * | 7/2017 | Hoshino | H04R 1/24 | |
| 2018/0182363 | A1 * | 6/2018 | Hoshino | G10H 1/32 | |
| 2019/0198000 | A1 * | 6/2019 | Oshiro | G10H 1/344 | |
| 2020/0322705 | A1 * | 10/2020 | Matsuba | H04R 1/025 | |
| 2020/0329290 | A1 * | 10/2020 | Murray | H04R 1/025 | |
| 2021/0168499 | A1 * | 6/2021 | Matsuba | G10H 1/344 | |
| 2021/0297767 | A1 * | 9/2021 | Kobayashi | H04R 1/2826 | |
| 2022/0270577 | A1 * | 8/2022 | Nakajima | H04R 1/2803 | |
| 2022/0303672 | A1 * | 9/2022 | Ioku | H04R 1/345 | |
| 2023/0199352 | A1 * | 6/2023 | Akai | H04R 1/2869 | 381/118 |
| 2023/0306942 | A1 * | 9/2023 | Katoh | H04R 9/025 | |

FOREIGN PATENT DOCUMENTS

| | | | | | |
|---|---|---|---|---|---|
| JP | H0626386 | U | | 4/1994 | |
| JP | 2541017 | B2 | | 10/1996 | |
| JP | H11219180 | A | | 8/1999 | |
| JP | 2000032578 | A | | 1/2000 | |
| JP | 2007184841 | A | | 7/2007 | |
| JP | 4582118 | B2 | | 9/2010 | |
| JP | 2015060112 | A | | 3/2015 | |
| JP | 2020190691 | A | * | 11/2020 | |
| JP | 6799785 | B2 | * | 12/2020 | G10C 3/12 |
| JP | 2021015253 | A | * | 2/2021 | |
| JP | 2021089333 | A | * | 6/2021 | G10H 1/32 |

OTHER PUBLICATIONS

Chinese Office Action (and an English language translation thereof) dated Dec. 5, 2023, issued in counterpart Chinese Application No. 202110280670.3.

* cited by examiner

ELECTRONIC MUSICAL INSTRUMENT AND ELECTRONIC KEYBOARD INSTRUMENT

BACKGROUND OF THE INVENTION

1. Field of the Invention

The present disclosure relates to an electronic musical instrument and an electronic keyboard instrument.

2. Description of the Related Art

In an electronic musical instrument which is disclosed in Japanese Utility Model Application Laid-Open No. Hei 6 (1994)-26386, a sound releasing hole for a sound which is emitted from a front-face part (an upper part) of a loudspeaker is formed in an upper case. In addition, a sound releasing hole for a sound which is emitted from a rear-face part (a lower part) of the loudspeaker is formed in a lower case and the sound releasing holes are surrounded by a cylindrical body. The rear-face part of the loudspeaker is hermetically sealed in a state of being inserted into the cylindrical body and the sound which is emitted from the rear-face part of the loudspeaker is released to the outside of the case through the sound releasing hole in the lower case with no leakage into the case.

BRIEF SUMMARY OF THE INVENTION

The present disclosure has been made in view of the above-described related art. According to one embodiment of the present disclosure, there is provided an electronic musical instrument which includes a loudspeaker which releases sounds in a first direction in accordance with an instrument playing operation, an internal component which includes a substrate, a case which houses the loudspeaker and the internal component and has a first region which faces a rear face of the loudspeaker and a second region which faces a rear face of the internal component and does not face the rear face of the loudspeaker and a sound releasing member which is disposed on an installation face side and in the second region, and releases acoustics in an acoustic space which is formed around the loudspeaker in a second direction which is opposite to the first direction.

DETAILED DESCRIPTION OF THE INVENTION

In the following, an electronic musical instrument according to one embodiment of the present disclosure will be described with reference to the appended drawings. In the following description of one embodiment of the present disclosure, an electronic keyboard instrument (an electronic keyboard) will be described as one example of the electronic musical instrument according to the present disclosure. Incidentally, the present disclosure is not limited to embodiments which will be described in the following and may be embodied by making appropriate modifications within a range not changing the gist of the present disclosure. In the following drawings, there are cases where illustration of some configurations of the electronic keyboard instrument is omitted for the convenience of description.

In the following description, "top", "bottom", "left", "right", "front" and "rear" are used with a direction which is marked with an arrow in each drawing being set as a reference unless otherwise clearly indicated in particular. However, an orientation of each configuration in the following description of one embodiment is merely one example and may be optionally changed.

Figure 1A:
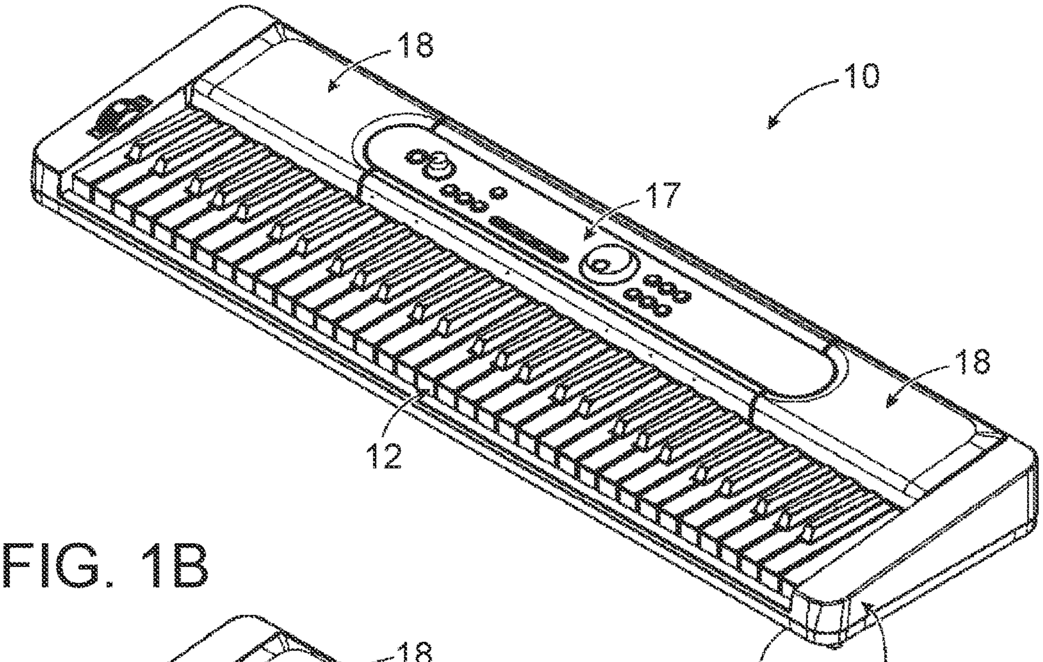
FIG. 1A is a perspective view illustrating one example of an electronic keyboard instrument according to one embodiment of the present disclosure.
Figure 1B:
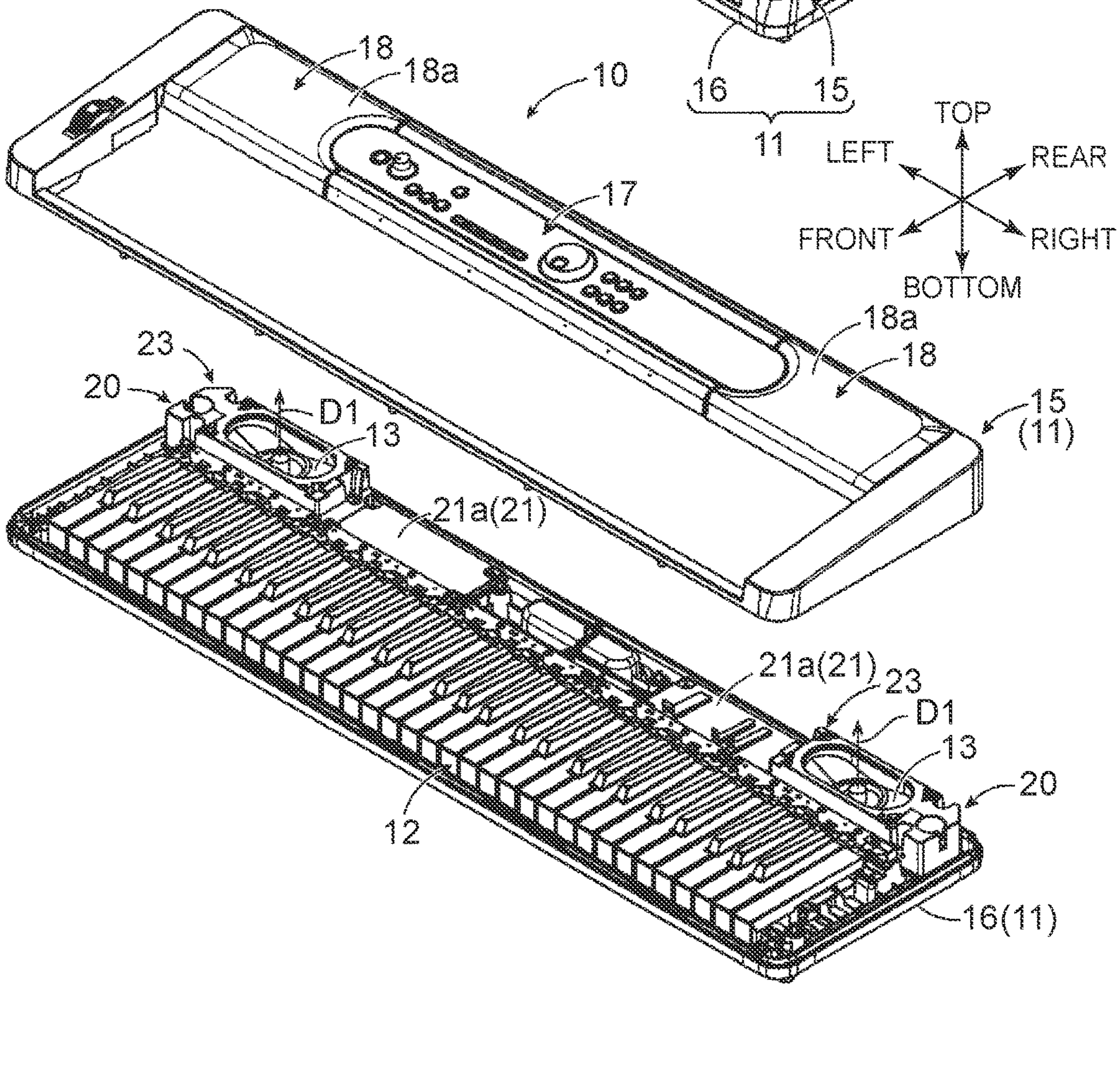
FIG. 1B is an exploded perspective view illustrating one example of the electronic keyboard instrument in FIG. 1A.

FIG. 1A is a perspective view illustrating one example of an electronic keyboard instrument 10 according to one embodiment of the present disclosure. FIG. 1B is an exploded perspective view illustrating one example of the electronic keyboard instrument 10 in FIG. 1A. As illustrated in FIG. 1A and FIG. 1B, the electronic keyboard instrument 10 includes a case 11, a keyboard 12 and two loudspeakers 13 (not illustrated in FIG. 1A) which are housed in the case 11 and releases sounds from the loudspeakers 13 in accordance with an operation of playing the keyboard 12.

The case 11 is configured by an upper-side (front-side) first case 15 through which the loudspeakers 13 release the sounds and a lower-side (rear-side) second case 16. The first case 15 and the second case 16 are formed with a left-right direction being defined as a longitudinal direction.

The first case 15 is installed so as to cover an almost rear half part of the second case 16 and a frame-shaped region which extends along an outer edge of the second case 16 when viewing from above. A rear left-right direction central section of the first case 15 is configured as a display operation section 17 that a display, a lighting part such as an LED (Light Emitting Diode) and so forth, and operators such as switches and so forth are installed. In addition, in the first case 15, sound release regions 18 are installed on both the left and right sides of the display operation section 17 and in each sound release region 18, a cover 18*a* is put on a speaker grille (not illustrated) that a plurality of holes is formed in a meshed state.

White keys and black keys of the keyboard 12 are loaded on a front side part of the second case 16 in a state of being arrayed along the longitudinal direction (the left-right direction) of the second case 16. In one embodiment, an array direction of the keyboard 12 and a transverse direction of each key are defined as the left-right direction and the longitudinal direction of each key is defined as a front-rear direction.

Each loudspeaker 13 is installed in the case 11 so as to release the sounds in a first direction D1 which is parallel with an upward direction. Here, the electronic keyboard instrument 10 includes two intermediate members 20 (not illustrated in FIG. 1A) which house therein the loudspeakers 13 respectively by being fixed to the second case 16 of the case 11. The loudspeakers 13 are installed in the second case 16 via the intermediate members 20 in a state where the first case 15 is separated from the second case 16 (before the second case 16 is combined with the first case 15). The intermediate members 20 are also installed in the case 11 in a state of being interposed between the first case 15 and the second case 16.

Figure 2A:
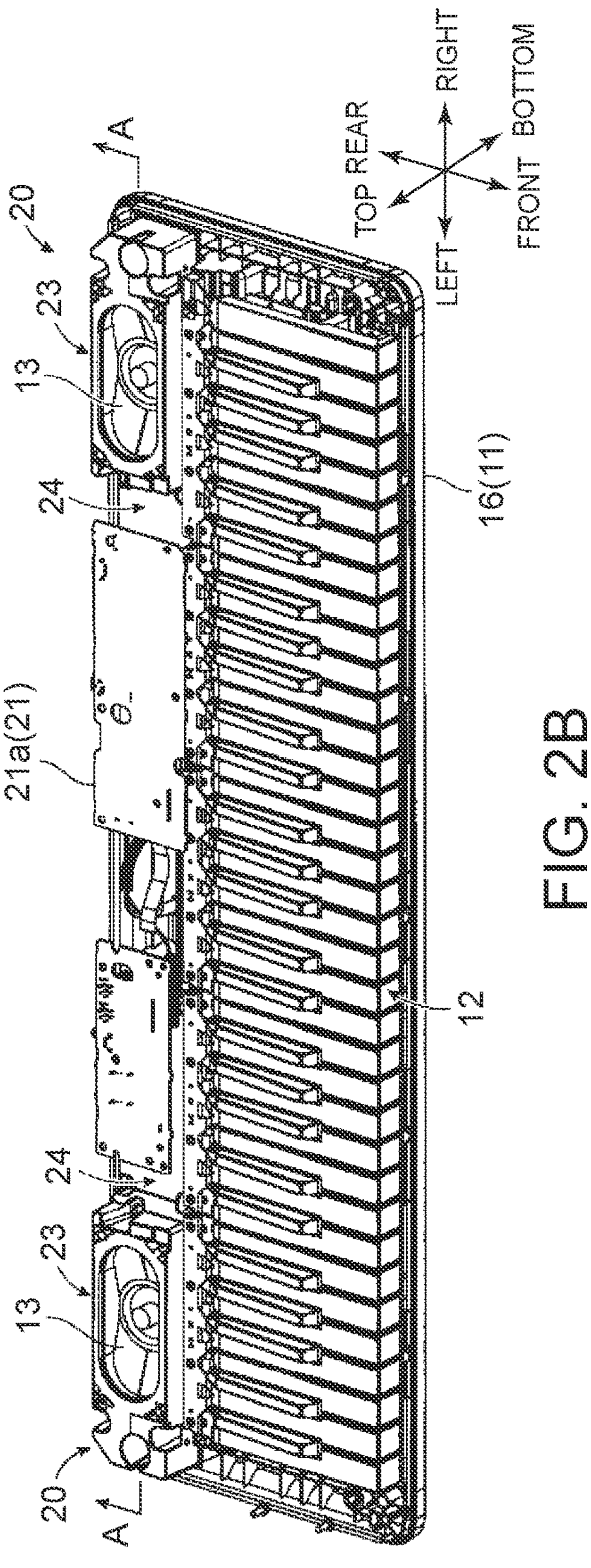
FIG. 2A is a perspective view illustrating one example of the electronic keyboard instrument in a state of eliminating illustration of a first case.

FIG. 2A is a perspective view illustrating one example of the electronic keyboard instrument 10 in a state of eliminating illustration of the first case 11. As illustrated in FIG. 2A, internal components 21 which include substrates 21*a* respectively are housed in the case 11 between the two loudspeakers 13 which are arrayed in the left-right direction. The internal components 21 are disposed directly under (a position where the display operation section 17 is superposed on the internal components 21 in a top-bottom direction) the display operation section 17 (see FIG. 1B). The substrates 21*a* are connected to respective parts of the display operation section 17, the loudspeakers 13 and so forth via wiring and terminals and are used for various controlling operations of the electronic keyboard instrument 10.

Figure 2B:
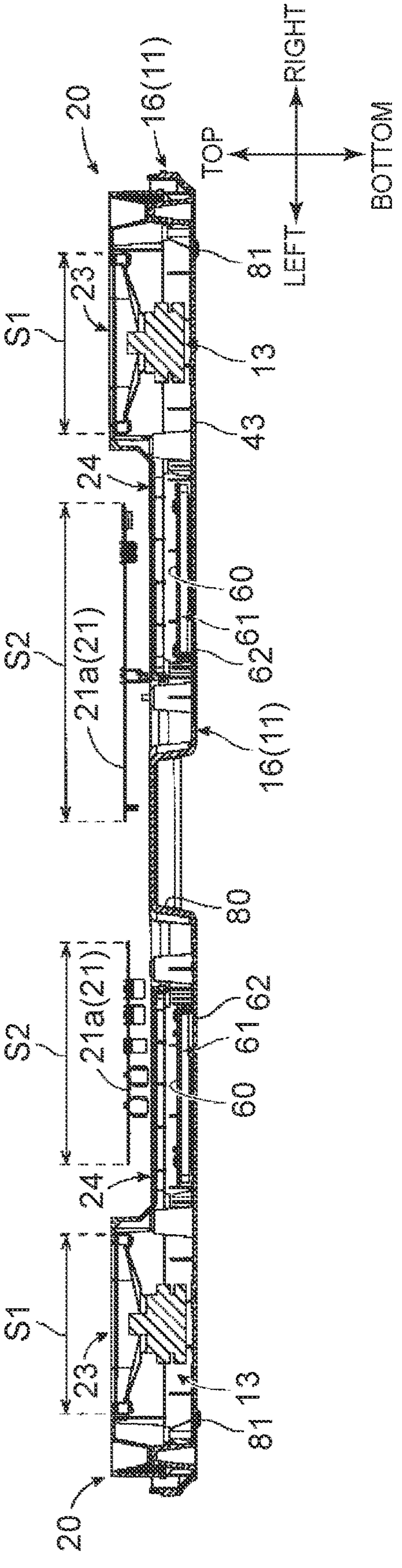
FIG. 2B is a sectional diagram taken along the A-A line in FIG. 2A.

FIG. 2B is a sectional diagram taken along the A-A line in FIG. 2A. As illustrated in FIG. 2B, the second case 16 of the case 11 includes first regions S1 and second regions S2. Each first region S1 is a region which faces a lower face (a rear face) of each loudspeaker 13 and on which each loudspeaker 13 is disposed (superposed) in the top-bottom direction. Each second region S2 is a region which faces a lower face (a rear face) of each internal component 21 and which does not face the lower face of each loudspeaker 13, in other words, on which each loudspeaker 13 is not disposed (superposed) in the top-bottom direction. Accordingly, each second region S2 does not include each first region S1 which faces the lower face of each loudspeaker 13.

Here, in the electronic keyboard instrument 10 according to one embodiment, the loudspeakers 13 and the intermediate members 20 are installed on the rearward left and right sides and structures which include the loudspeakers 13 and the intermediate members 20 respectively are installed in an almost symmetric state with a left-right direction central position of the electronic keyboard instrument 10 being interposed between the structures. Accordingly, in the following, the loudspeaker 13, the intermediate member 20 and so forth which are located on the right side will be described and there are cases where illustration, description and so forth of the loudspeaker 13, the intermediate member 20 and so forth which are located on the left side are omitted.

As illustrated in FIG. 2A, the intermediate member 20 includes a main region 23 which is illustrated as the first region S1 and in which the loudspeaker 13 is disposed and an extended region 24 which is illustrated as the second region S2 and on the upper outer side of which the internal component 21 is disposed. In other words, the internal component 21 is disposed in a region which is closer to the left-right direction central part of the entire keyboard 12 (not illustrated in FIG. 2B) than to the main region 23 and that internal component 21 is disposed in an outer space which is located above the extended region 24. In addition, the extended region 24 is formed in a state of including a region which is located between the left and right two loudspeakers 13.

Figure 3:
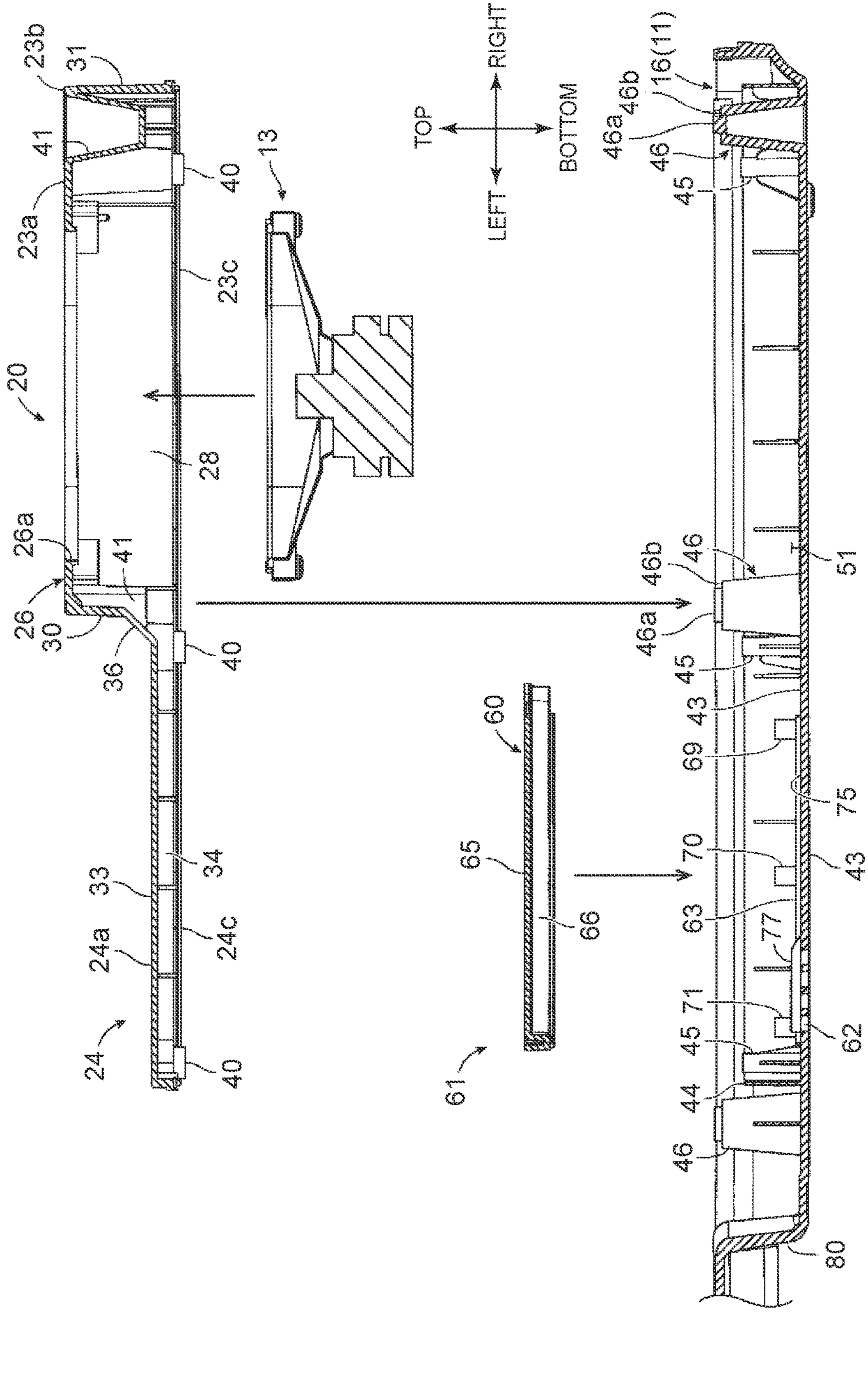
FIG. 3 is a partial exploded sectional diagram of the sectional diagram in FIG. 2B.
Figure 4:
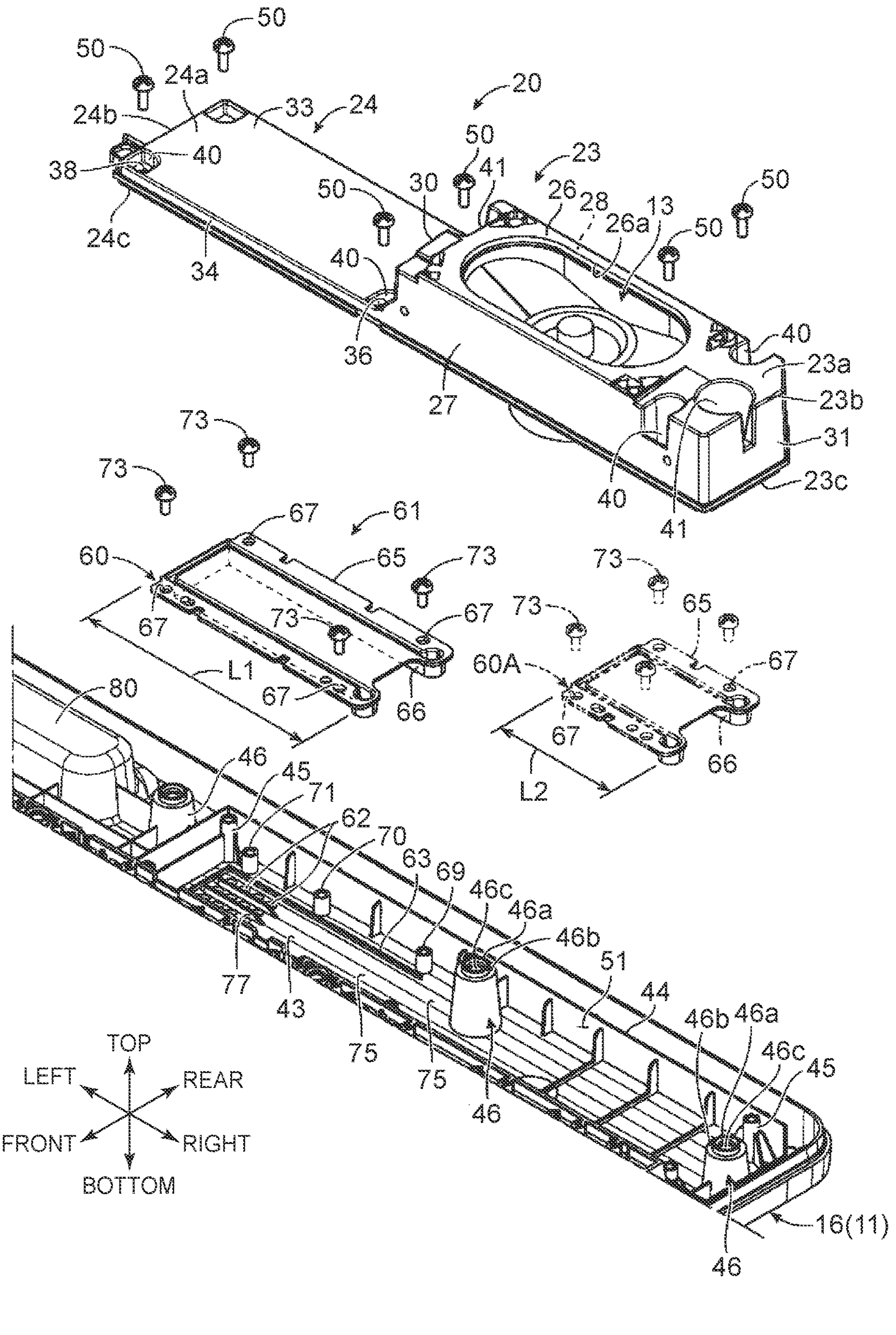
FIG. 4 is a partial exploded perspective view illustrating one example of the electronic keyboard instrument in FIG. 1B.

FIG. 3 is a partial exploded sectional diagram of the sectional diagram in FIG. 2B. FIG. 4 is a partial exploded perspective view illustrating one example of the electronic keyboard instrument 10 in FIG. 1B. In the intermediate member 20, a left-right direction length is made longer than a front-rear direction length. Likewise, in each of the main region 23 and the extended region 24, a left-right direction length is made longer than a front-rear direction length. Bottom faces 23*c* and 24*c* which serve as respective lower end faces of the main region 23 and the extended region 24 respectively are formed along the same plane which is parallel with the front-rear direction and the left-right direction.

The main region 23 includes a top wall 26 which forms a top face (an upper face) 23*a* of the main region 23, a front side wall (a side wall portion) 27 (not illustrated in FIG. 3) which is contiguous to a front end of the top wall 26 and a rear side wall (a side wall portion) 28 which is contiguous to a rear end of the top wall 26. In addition, the main region 23 includes an intermediate wall 30 which is contiguous to respective ends of the top wall 26, the front side wall 27 and the rear side wall 28 which are located on the extended region 24 side and an outer side wall (a side wall portion) 31 which is contiguous to respective ends of the top wall 26, the front side wall 27 and the rear side wall 28 which are located on the opposite side of the extended region 24.

The bottom face 23*c* of the main region 23 is formed by lower end faces of the front side wall 27, the rear side wall 28 and the outer side wall 31. Accordingly, the front side wall 27, the rear side wall 28 and the outer side wall 31 extend from an outer edge portion 23*b* of the top face 23*a* to the bottom face 23*c* in the top-bottom direction.

The loudspeaker 13 has a cone part that a left-right direction length is made longer than a front-rear direction length and also in the main region 23, a left-right direction length is made longer than a front-rear direction length in accordance with the shape of the cone part of the loudspeaker 13. The top wall 26 which is located in the main region 23 has a sound releasing hole 26*a* at a position which faces the loudspeaker 13. Also, in the sound releasing hole 26*a*, a left-right direction length is made longer than a front-rear direction length similarly to the main region 23. The loudspeaker 13 is fixed to a lower face of the top wall 26 in the vicinity of an edge that the sound releasing hole 26*a* is formed in a state of being pressed against the lower face via an appropriate cushioning material.

The extended region 24 includes an upper wall 33 which forms a top face (an upper face) 24*a* of the extended region 24 and a rib side wall (a side wall portion) 34 which projects downward from outer edge portions 24*b* on the three sides except a portion of the top face 24*a* which is adjacent to the main region 23. The bottom face 24*c* of the extended region 24 is formed by a lower end face of the rib side wall 34.

Accordingly, the rib side wall 34 extends so as to project from the outer edge portions 24*b* of the top face 24*a* to the bottom face 24*c* of the extended region 24 in the top-bottom direction.

The intermediate member 20 includes the above-described respective constitutional elements, and thereby is shaped into a box-form the lower side of which is made open and forms a loudspeaker box. In the intermediate member 20, a height from the bottom face 23*c* to the top face 23*a* of the main region 23 is made higher than a height from the bottom face 24*c* to the top face 24*a* of the extended region 24. In other words, the main region 23 and the extended region 24 are different from each other in top-bottom width and the extended region 24 is formed at a position which is lower (more downward) than the position of the main region 23. Accordingly, it becomes possible to form a space at a position which is located above the extended region 24 and lower than the top face 23*a* of the main region 23. Incidentally, the loudspeaker 13 is formed into a size that the loudspeaker 13 sticks out of the bottom face 23*c* of the main region 23 in a state of being fixed to the top wall 26 of the main region 23.

The intermediate member 20 has an inclined portion 36 at a boundary between the main region 23 and the extended region 24. The inclined portion 36 is formed so as to connect between the lower end of the intermediate wall 30 in the main region 23 and the upper wall 33 in the extended region 24. The inclined portion 36 is formed in an inclination direction that the inclined portion 36 leaves the intermediate wall 30 gradually and goes downward as it extends from an upper end which is located at a boundary position between the inclined portion 36 and the intermediate wall 30 and approaches the upper wall 33.

Figure 5A:
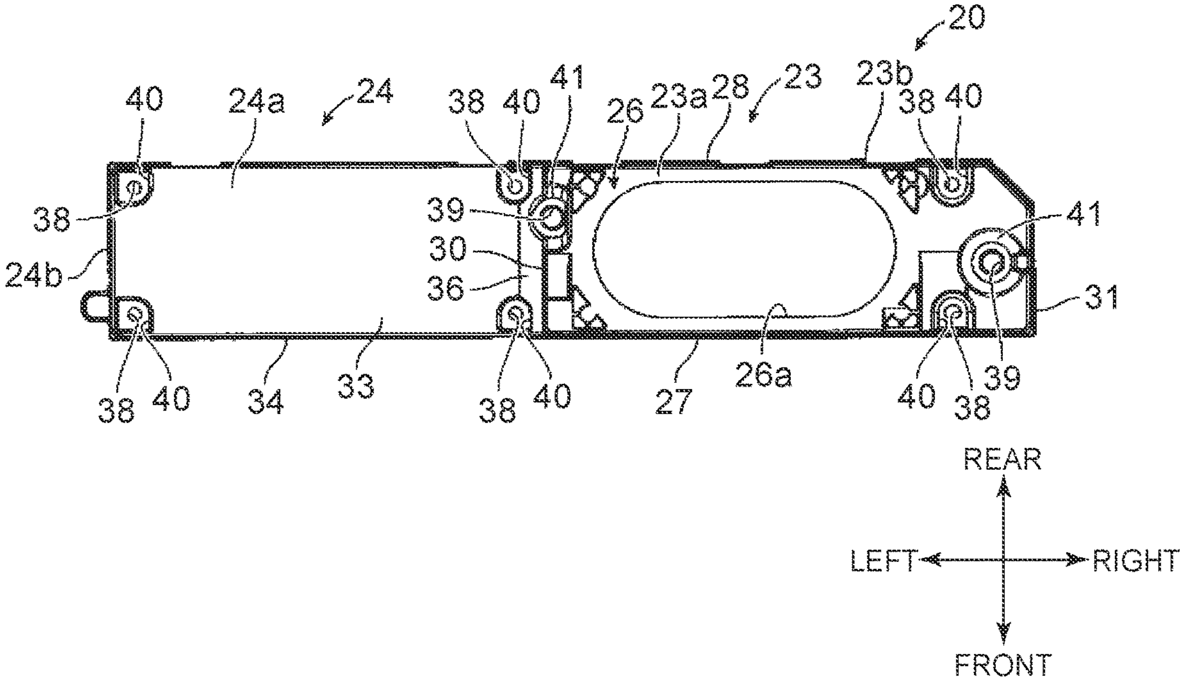
FIG. 5A is a plan view illustrating one example of an intermediate member.
Figure 5B:
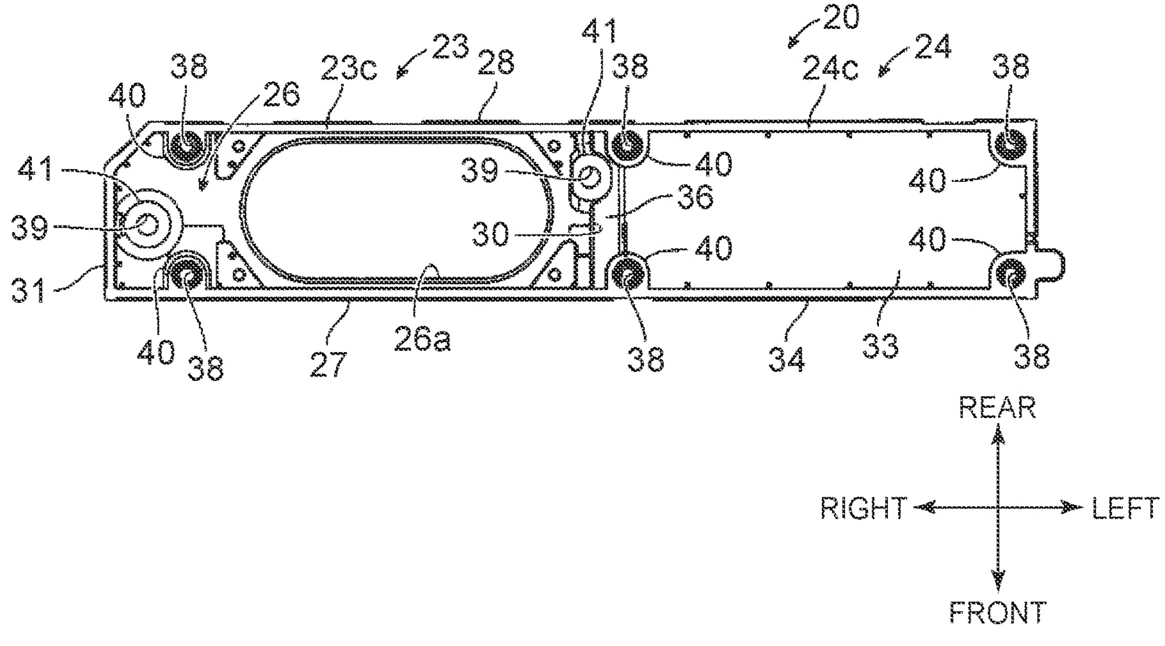
FIG. 5B is a bottom view illustrating one example of the intermediate member.

FIG. 5A is a plan view illustrating one example of the intermediate member 20. FIG. 5B is a bottom view illustrating one example of the intermediate member 20. As illustrated in FIG. 5A and FIG. 5B, six attachment holes 38 and two fixing holes 39 are formed in the intermediate member 20.

The attachment holes 38 are formed in the vicinity of four corners of the intermediate member 20 and on both the front side and the rear side of a left-right direction intermediate position where the intermediate member 20 is superposed on the inclined portion 36 when viewing in the top-bottom direction. Each attachment hole 38 is formed in each boss 40 for the attachment hole (hereinafter, referred to as the attachment hole boss 40. The same applies to 41 and 63) and a bottom face of the attachment hole boss 40 is formed in a state of projecting downward from the bottom face 23*c* of the main region 23 and the bottom face 24*c* of the extended region 24 (see FIG. 3). Each attachment hole boss 40 which is located at the position where the attachment hole boss 40 is superposed on the inclined portion 36 includes therein a semicircular-arc shaped outer circumferential surface in a state where the intermediate member 20 is viewed from below, that is, in a state which is illustrated in FIG. 5B.

The fixing holes 39 are formed on the main region 23 side. Specifically, the fixing holes 39 are formed in left and right portions of the main region 23 one by one when viewing in the top-bottom direction. Each fixing hole 39 is formed in a fixing hole boss (a boss for the fixing hole) 41 and the fixing hole boss 41 is formed into such a shape that a cylindrical body is partially notched. A bottom face of the fixing hole boss 41 is formed at a position which is higher than positions of the bottom face 23*c* of the main region 23 and the bottom face 24*c* of the extended region 24 (see FIG. 3).

Figure 6:
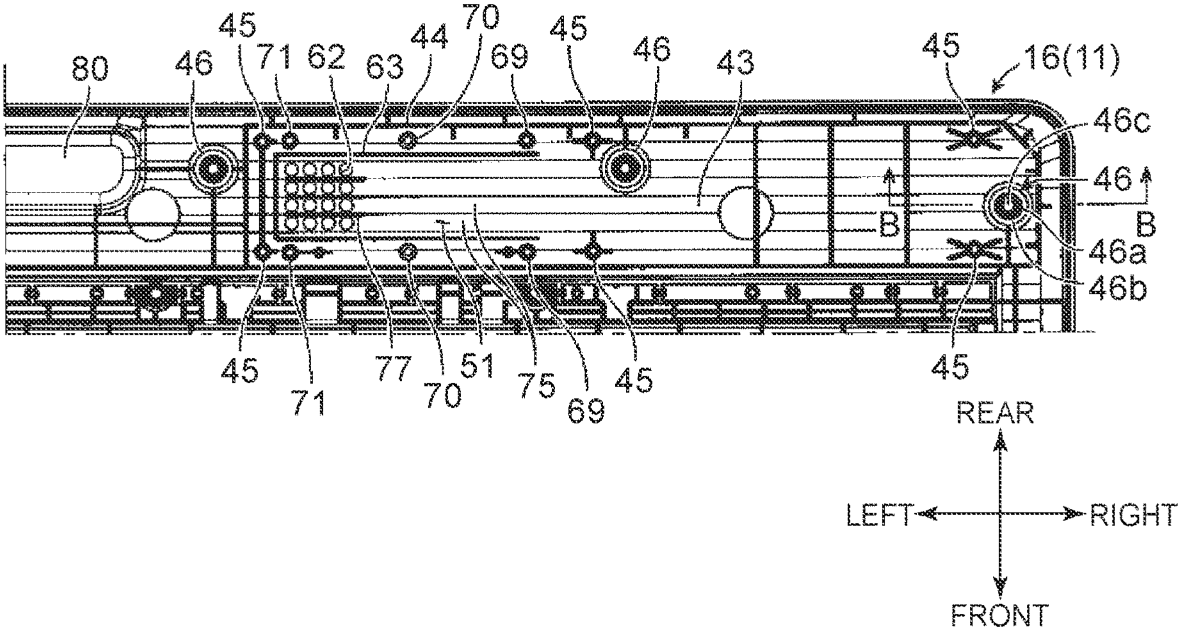
FIG. 6 is a partial plan view illustrating one example of a second case.

FIG. 6 is a partial plan view illustrating one example of the second case 16. As illustrated in FIG. 4 and FIG. 6, the second case 16 includes a base part 43 which is disposed in almost parallel with the front-rear direction and the left-right direction and a bottom wall of the entire case 11 is formed by the base part 43. A frame-shaped rib 44 is formed on the upper-face side of the base part 43 at a position where the intermediate member 20 (not illustrated in FIG. 6) is fixed. In addition, six intermediate member attachment bosses 45 and two case fixing bosses 46 are formed on the upper face side of the base part 43 and on the inner side of the frame-shaped rib 44.

The frame-shaped rib 44 is disposed at a position which faces the bottom faces 23*c* and 24*c* of the main region 23 and the extended region 24 of the intermediate member 20 and is formed into an almost rectangular shape which follows the shape of the intermediate member 20 when viewing in the top-bottom direction. Accordingly, the frame-shaped rib 44 is formed such that the intermediate member 20 is placed in a state where the bottom faces 23*c* and 24*c* of the main region 23 and the extended region 24 of the intermediate member 20 are in contact with the upper end face of the frame-shaped rib 44 so as to form no gap between the upper end face of the frame-shaped rib 44 and the bottom faces 23*c* and 24*c* of the main region 23 and the extended region 24 of the intermediate member 20 with the aid of such a contact state as described above (see FIG. 9A).

The intermediate member attachment bosses 45 are formed at six positions which face the attachment holes 38 in the intermediate member 20. A screw hole is formed in each intermediate member attachment boss 45 and a screw 50 (not illustrated in FIG. 6) which is inserted into and passes through the attachment hole 38 (see FIG. 5A) is screwed into the screw hole.

An upper end face of each intermediate member attachment boss 45 is formed lower than the upper end face of the frame-shaped rib 44. Specifically, the upper end face of each intermediate member attachment boss 45 is formed lower than the upper end face of the frame-shaped rib 44 by the amount that the respective attachment hole bosses 40 project downward from the bottom faces 23*c* and 24*c* of the main region 23 and the extended region 24 of the intermediate member 20. Accordingly, in a case where the intermediate member 20 is placed on the frame-shaped rib 44, the bottom face of each attachment hole boss 40 enters a state of coming into contact with the upper end face of each intermediate member attachment boss 45.

Each attachment hole boss 40 is fastened with the screw 50 and each intermediate member attachment boss 45 by inserting the screw 50 into each attachment hole 38 in the intermediate member 20 and screwing the screw 50 into the screw hole in each intermediate member attachment boss 45 in this state. Owing to such fastening, the intermediate member 20 is fixed to the second case 16 of the case 11 (see FIG. 1B) and thereby it becomes possible to maintain a state where the intermediate member 20 is attached to the second case 16 of the case 11 in a state where the first case 15 is separated from the second case 16.

In a case where the intermediate member 20 is fixed to the second case 16 in this way, an acoustic space 51 (see FIG. 9A) which is closed except sound holes which will be described later is formed by the intermediate member 20, the loudspeaker 13, the frame-shaped rib 44 and the base part 43 of the second case 16. In other words, the acoustic space 51 is formed as an inner-side space which is surrounded by the intermediate member 20, the loudspeaker 13, the frame-shaped rib 44 and the base part 43.

The intermediate member 20 is fixed to the second case 16 and thereby houses the loudspeaker 13 in the acoustic space 51 which is formed therein. In addition, the acoustic space 51 is formed around the loudspeaker 13. The acoustic space 51 is formed as a space that the sound which is radiated from the loudspeaker 13 downward resonates. In the acoustic space 51, sound leakage through a gap between the upper end face of the frame-shaped rib 44 and the bottom faces 23*c* and 24*c* of the main region 23 and the extended region 24 of the intermediate member 20 is avoided.

The case fixing bosses 46 are formed at two positions which face the fixing holes 39 in the intermediate member 20. An upper end face of each case fixing boss 46 is formed higher than the frame-shaped rib 44 (see FIG. 3), and in a case where the intermediate member 20 is fixed to the second case 16, the bottom face of each fixing hole boss 41 is brought into a state of coming into contact with the upper end face of each case fixing boss 46.

Figure 7:
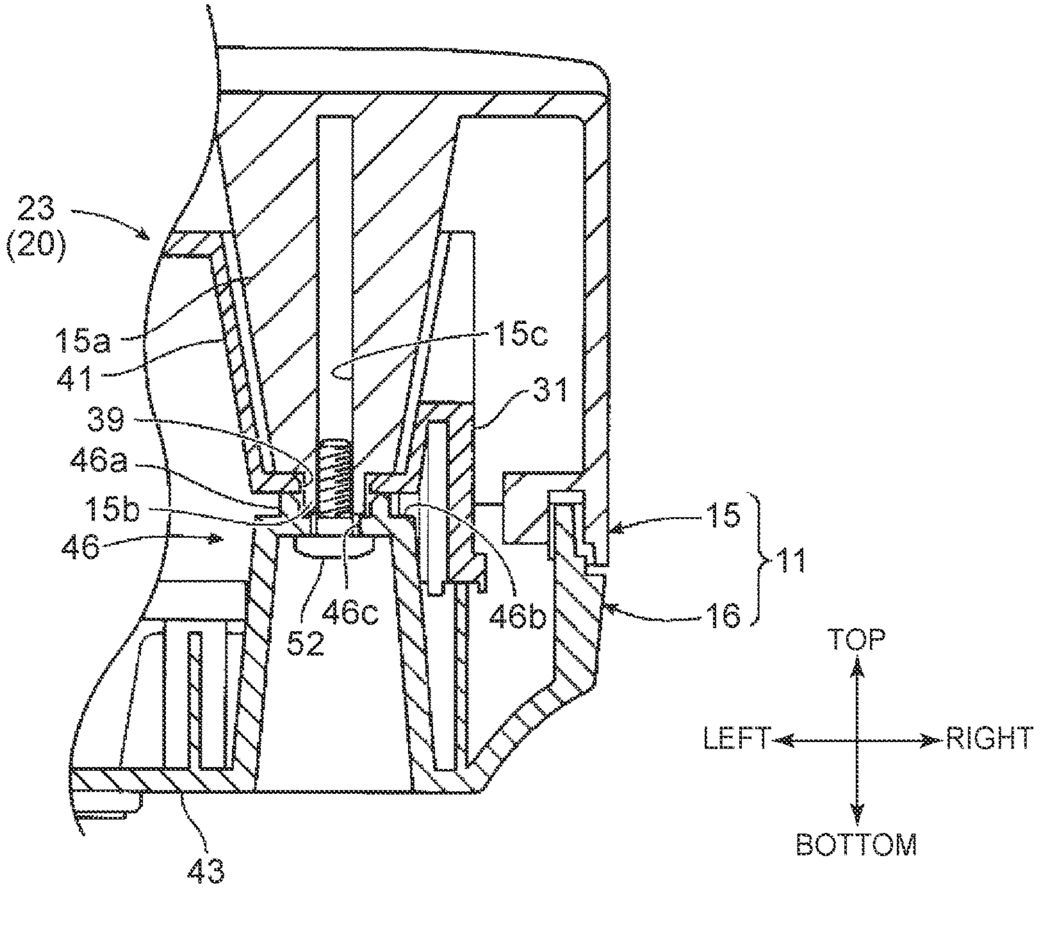
FIG. 7 is a partial longitudinal sectional diagram illustrating one example of a boss for fixing hole and surroundings thereof.
Figure 8:
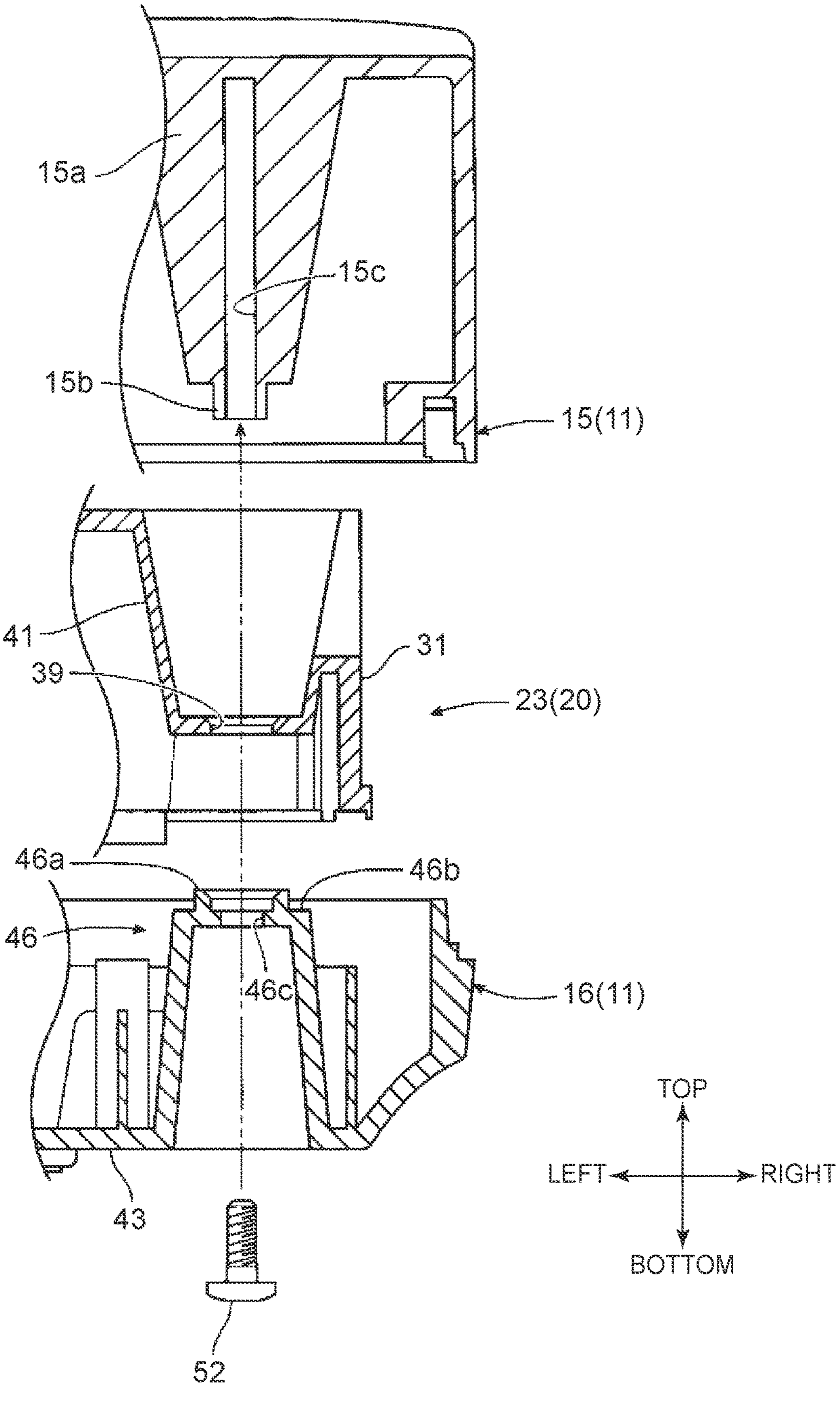
FIG. 8 is an exploded diagram that the diagram in FIG. 7 is illustrated in an exploded state.

FIG. 7 is a partial longitudinal sectional diagram illustrating one example of the fixing hole boss 41 and surroundings thereof. FIG. 8 is an exploded diagram that the diagram in FIG. 7 is illustrated in an exploded state. FIG. 7 and FIG. 8 are the sectional diagrams taken along the B-B line in FIG. 6. FIG. 7 illustrates a surrounding structure of the fixing hole boss 41 on the outer side wall 31 side in the main region 23 and illustrates a state where the first case 15 and the second case 16 are combined with each other while fixing the intermediate member 20 to the second case 16. The first case 15 includes a downward facing boss 15*a* which projects downward and is inserted into the fixing hole boss 41 in the state in FIG. 7. A leading end of the downward facing boss 15*a* is formed as a small-diameter portion 15*b* and the small-diameter portion 15*b* is inserted into the fixing hole 39. A screw hole 15*c* which extends in the top-bottom direction is formed in the downward facing boss 15*a*.

The case fixing boss 46 includes an annular rib 46*a* which forms an upper end face of the case fixing boss 46 and a top face portion 46*b* from which the annular rib 46*a* is erected. A hole 46*c* into which the screw 52 is to be inserted is formed in the top face portion 46*b* and the annular rib 46*a*. An inner circumferential shape of the annular rib 46*b* is formed the same as or slightly larger than an outer circumferential shape of the small-diameter portion 15*b* and therefore the annular rib 46*a* and the small-diameter portion 15*b* are brought into a mutually fitted state. Respective inner circumferential upper end portions of the fixing hole 39 and the annular rib 46*a* are tapered.

In a state where the intermediate member 20 is fixed to the second case 16, the bottom face of the fixing hole boss 41 is in contact with the annular rib 46*a* which forms the upper end face of the case fixing boss 46 and the fixing hole 39 and the hole 46*c* in the case fixing boss 46 are located on the same center line. The second case 16 is combined with the first case 15 by covering the first case 15 with the second case 16 from above from the state where the intermediate member 20 is fixed to the second case 16 and thereby the downward facing boss 15*a* of the first case 15 is inserted into the fixing hole boss 41. In this case, the small-diameter portion 15*b* which is the leading end of the downward facing boss 15*a* fits into the annular rib 46*a* passing through the fixing hole 39.

In a state where the small-diameter portion 15*b* and the annular rib 46 are mutually fitted in this way, a screw 52 is screwed into the screw hole 15*c* in the downward facing boss 15*a* from below the case fixing boss 46 through the hole 46*c* and the fixing hole 39. Thereby, the top face portion 46*b* of the case fixing boss 46 is fastened with the screw 52 and the downward facing boss 15*a* and a state where the first case 15 and the second case 16 are mutually combined is fixed. In addition, the fixing hole boss 41 is fastened with the downward facing boss 15*a* and the case fixing boss 46 and thereby the intermediate member 20 is fixed by being brought into a state of being sandwiched between the first case 15 and the second case 16. In this state, the fixing hole 39 is used for mutually fixing the first case 15, the second case 16 and the intermediate member 20.

Incidentally, although description is made by illustrating the fixing hole boss 41 which is disposed on the outer side wall 31 side of the main region 23 and the surroundings thereof with reference to FIG. 7 and FIG. 8, a configuration which is the same as the configuration in FIG. 7 and FIG. 8 is also adopted to another fixing hole boss 41 and surroundings thereof. In addition, as illustrated in FIG. 6, the case fixing boss 46 is also formed on the outer side of the frame-shaped rib 44. The case fixing boss 46 is not used for fixing the intermediate member 20 but used for fixing the first case 15 and the second case 16 together.

Figure 9A:
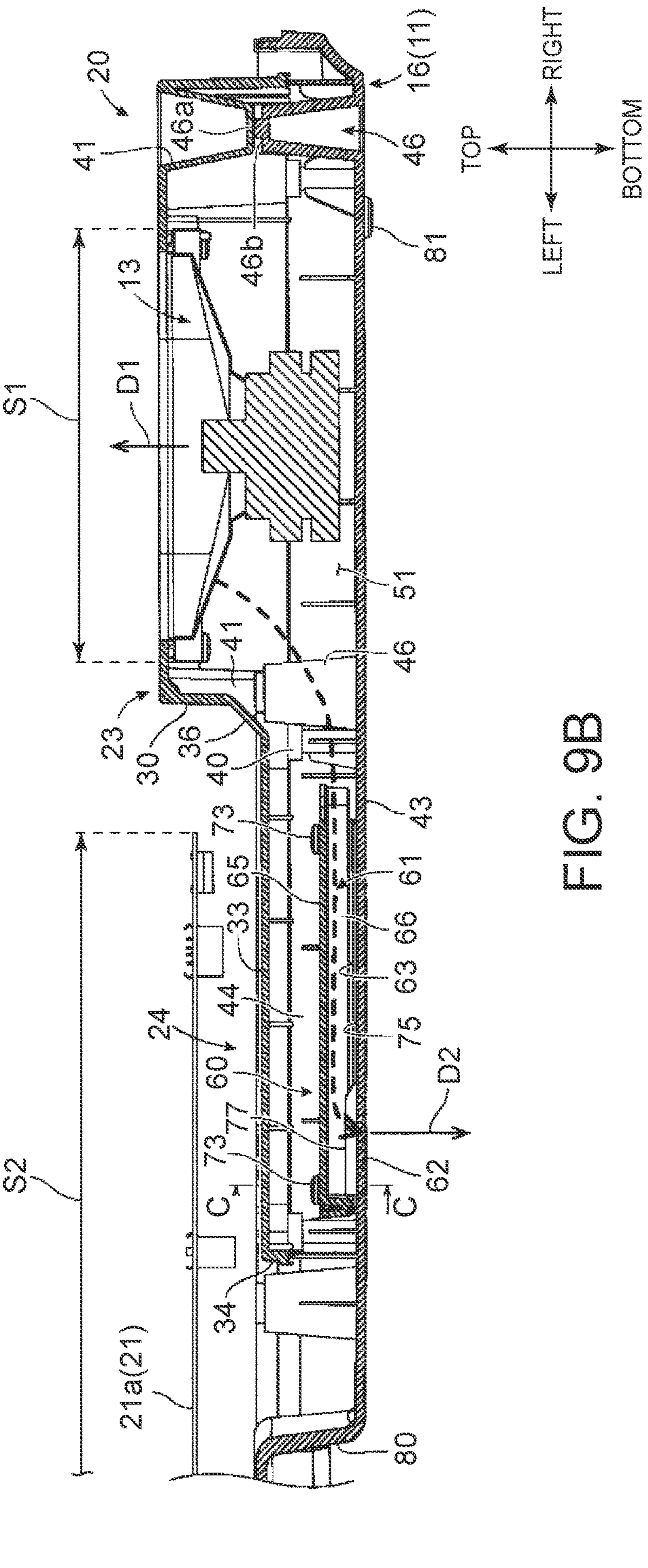
FIG. 9A is a partially enlarged sectional diagram of the sectional diagram in FIG. 2B.

FIG. 9A is a partially enlarged diagram of the cross-sectional diagram in FIG. 2B. As illustrated in FIG. 9A, the electronic keyboard instrument 10 includes a board component 60 which functions as a sound releasing member which is installed in the second region S2. The board components 60 are installed in the two second regions S2 one by one and thereby these two board components 60 are disposed between the two loudspeakers 13 (see FIG. 2B). The electronic keyboard instrument 10 includes a bass reflex duct 61 which is formed by each board component 60. In other words, the board component 60 forms part of the bass reflex duct 61. The bass reflex duct 61 extends in the left-right direction and is formed with the left-right direction being defined as the longitudinal direction.

The board components (the sound releasing members) 60 are disposed on the installation face side of the lower case (the second case 16). In one embodiment, each loudspeaker 13 releases the sounds upward and the sounds are released to the installation face side (downward) via the bass reflex duct 61 in the acoustic space that the loudspeakers 13 are disposed. Bass is more emphasized by releasing the sounds to the installation face side (downward) via the bass reflex duct 61.

In addition, the electronic keyboard instrument 10 includes sound holes 62 (also see FIG. 6) which function as bass reflex ports which are formed as one unit at a position which faces the board component 60. The sound holes 62 communicate with an inner space in the bass reflex duct 61. In the electronic keyboard instrument 10, acoustics in the acoustic space 51 are released in a second direction D2 which is parallel with a downward direction which is opposite to the first direction D1 (the upward direction) via the bass reflex duct 61 which includes the board component 60 and the sound holes 62.

As illustrated in FIG. 4, the bass reflex duct 61 is configured by the base part 43 which forms the inner wall of the second case 16, a duct rib (a rib for the duct) 63 which is erected from the base part 43 and the board component 60 which is disposed above the duct rib 63.

The duct rib 63 is disposed in the frame-shaped rib 44 and is formed into an inverted-C shape (in other words, a C-shape which is square in corner. See FIG. 6) when viewing from above in a region which is covered with the extended region 24 of the intermediate member 20. In the duct rib 63, two ribs (one of them is not illustrated in FIG. 4) which extend in the left-right direction in parallel with each other and one rib which extends between ends of the above two ribs on the side which is opposite to the loudspeaker 13 (the left side) are formed contiguously in a state of making the loudspeaker 13 side (the right side) open.

The board component 60 is placed on an upper end face of the duct rib 63. The board component 60 includes a main wall 65 which is parallel with the front-rear direction and the left-right direction and a three-sided wall 66 which projects downward from a lower face of the main wall 65. The three-sided wall 66 is installed at a position which faces the duct rib 63 and is formed into an inverted-C shape which is the same as the shape of the duct rib 63 when viewing in the top-bottom direction. That is, the three-sided wall 66 of the board component 60 is formed such that a lower end face of the three-sided wall 66 is placed in contact with the upper end face of the duct rib 63 and no gap is formed between the board component 60 and the duct rib 63 with the aid of such a contact state as described above (see FIG. 9A).

In the board component 60, a plurality of holes is formed on both the front side and the rear side of the main wall 65. In the plurality of holes, holes which are formed in four corners of the main wall 65 and to which a reference numeral 67 is assigned in FIG. 4 are formed as board component attachment holes 67.

The board component 60 is formed with a left-right direction length, that is, a longitudinal-direction length being set as a first length L1. Here, in one embodiment, it is possible to select and utilize a board component 60A (indicated by a two-point chain line in FIG. 4) which is shorter than the board component 60 in the left-right direction length. The left-right direction of the board component 60A is set as a second length L2 which is shorter than the first length L1. In one embodiment, the second length L2 is set to a length which is almost half of the first length L1. The board component 60A also includes the main wall 65 and the three-sided wall 66 and the board component attachment holes 67 are formed in four corners of the main wall 65.

The second case 16 includes six bosses (see FIG. 6. The front-side three bosses are not illustrated in FIG. 4) which are formed on the upper face side of the base part 43 and on both the front side and the rear side of the duct rib 63. In these six bosses, two bosses which are formed at right end vicinity positions (positions which are close to the loudspeaker 13) of the duct rib 63 are set as first fixing portion 69. In addition, in the six bosses, two bosses which are formed at left-right direction intermediate vicinity positions of the duct rib 63 are set as second fixing portions 70. Further, in the six bosses, two bosses which are formed at left end vicinity positions (the positions which are opposite to the loudspeaker 13) of the duct rib 63 are set as third fixing portions 71.

The first fixing portions 69 and the third fixing portions 71 are used for fixing the board component 60 which has the first length L1 and are formed at positions which face the board component attachment holes 67 in a state where the three-sided wall 66 of the board component 60 is placed on the duct rib 63. On the other hand, the second fixing portions 70 and the third fixing portions 71 are used for fixing the board component 60A which has the second length L2 and are formed at positions which face the board component attachment holes 67 in a state where the three-sided wall 66 of the board component 60A is placed on the duct rib 63.

Screw holes are formed in the fixing portions 69 to 71. Then, screws 73 which are inserted into and pass through the respective board component attachment holes 67 are screwed into the screw holes in the fixing portions 69 and 71 or 70 and 71. Owing to screwing of the screws 73 into the screw holes in the fixing portions 69 and 71 or 70 and 71, surroundings of the respective board component attachment holes 67 are fastened with the screws 73 and leading ends of the fixing portions 69 and 71 or 70 and 71 and thereby the board component 60 or 60A is fixed to the second case 16. Incidentally, in a case where the board component 60 which has the first length L1 is fixed, the second fixing portion 70 is not used. In a case where the board component 60A which has the second length L2 is fixed, the first fixing portion 69 is not used.

The bass reflex duct 61 is formed into a square tubular shape that a length in the left-right direction which is set as the longitudinal direction is longer than a length in the front-rear direction which is set as the transverse direction and which is flat in the top-bottom direction. In the bass reflex duct 61, the right side which is the loudspeaker 13 side is opened and the left side which is opposite to the loudspeaker 13 side, both the front side and the rear side and both the upper side and the lower side are closed (see FIG. 9A).

The second case 16 includes a plurality of U-shaped grooves 75 which is formed on its upper face which is an inner-side face of the base part 43 and extends in the left-right direction which corresponds to the longitudinal direction of the bass reflex duct 61. Since in the acoustic space 51, the sound holes 62 and the loudspeaker 13 are separated from each other in the left-right direction, the U-shaped grooves 75 are formed so as to extend in a direction along which the U-shaped grooves 75 connect the sound holes 62 and the loudspeaker 13 together.

Figure 9B:
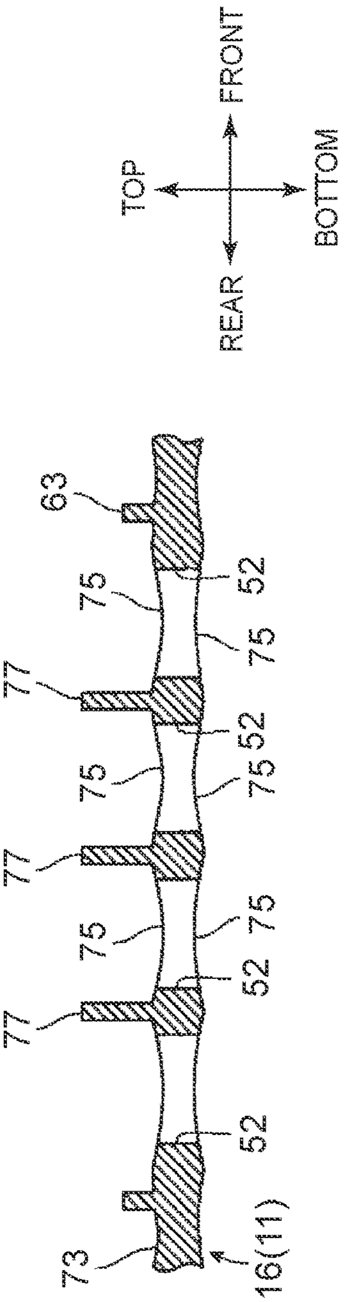
FIG. 9B is a partially enlarged sectional diagram taken along the C-C line in FIG. 9A.

FIG. 9B is a partially enlarged sectional diagram taken along the C-C line in FIG. 9A. As illustrated in FIG. 9B, each U-shaped groove 75 is dented into an arc shape in section which is orthogonal to a direction that the U-shaped grooves 75 extend. Then, the plurality of U-shaped grooves 75 which is disposed adjacently to one another in the front-rear direction is formed into a wave shape. Incidentally, the plurality of U-shaped grooves 75 is also formed on a lower face of the second case 16 which is an outer-side face of the base part 43 (also see FIG. 10).

Each reinforcement rib 77 which extends in the left-right direction (a direction which is orthogonal to the sheet surface in FIG. 9B) is formed on each lateral portion, in other words, a boundary between every two mutually adjacent U-shaped grooves in the front-rear direction in the plurality of U-shaped grooves 75 in a region that the sound holes 62 are formed. In addition, the respective sound holes 62 are formed in bottoms of the plurality of U-shaped grooves 75 in the second region S2 and each sound hole 62 is formed so as to have a size with which each sound hole 62 fits in a front-rear width of each U-shaped groove 75.

As illustrated in FIG. 4 and FIG. 6, the sound holes 62 are configured by a plurality of round holes which passes through the base part 43 of the second case 16 in the top-bottom direction. Accordingly, the sound holes 62 are exposed to the outside through the lower face of the second case 16 (see FIG. 10). In one embodiment, the sound holes 62 are formed to be arrayed in a 4 (rows)×4 (columns) matrix in the front-rear direction and the left-right direction (the longitudinal direction and the transverse direction of the bass reflex duct 61).

Returning to the example in FIG. 9A, the sound holes 62 (as one unit) are formed at a rather leftward position in the bass reflex duct 61, in other words, at a position which is separated from the loudspeaker 13 as far as possible in the bass reflex duct 61. Accordingly, the sound holes 62 are brought into a state where the left side (the side which is opposite to the loudspeaker 13) and both the front side and the rear side thereof are surrounded by the three-sided wall 66 of the board component 60 or 60A which forms the bass reflex duct 61.

Each reinforcement rib 77 is formed in the left-right direction so as to extend slightly beyond the region that the sound holes 62 are formed in both leftward and rightward directions. Accordingly, respective reinforcement ribs 77 are formed so as to divide the sound holes 62 which are arrayed in the front-rear direction into respective rows. The right end side (the side which is opposite to the loudspeaker 13) of each reinforcement rib 77 is formed into an inclined shape.

Figure 10:
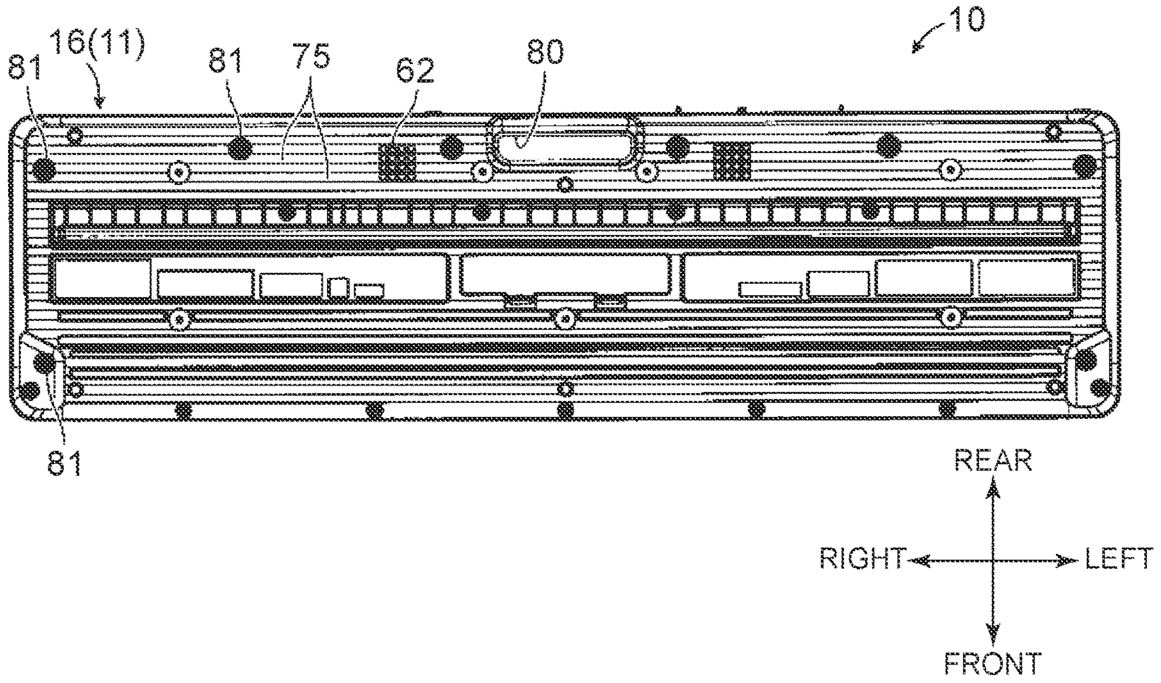
FIG. 10 is a bottom view illustrating one example of the electronic keyboard instrument in FIG. 1A.

FIG. 10 is a bottom view illustrating one example of the electronic keyboard instrument 10. As illustrated in FIG. 10, a recessed part 80 into which insertion of a user's fingertip is possible and which functions as a grip part is formed in a left-right direction central portion on the rear of the second case 16 of the case 11. Accordingly, it becomes possible for the user to carry the electronic keyboard instrument 10 while gripping the electronic keyboard instrument 10 by inserting his/her fingertip into the recessed part 80. The recessed part 80 is formed at a position where the recessed part 80 is superposed on the display operation section 17 (see FIG. 1B) of the first case 15 in the top-bottom direction. In addition, as illustrated in FIG. 2B, the recessed part 80 is formed between two loudspeakers 13 and each bass reflex duct 61 and each extended region 24 of each intermediate member 20 are disposed in each region which is sandwiched between each loudspeaker 13 and the recessed part 80.

Figure 11:
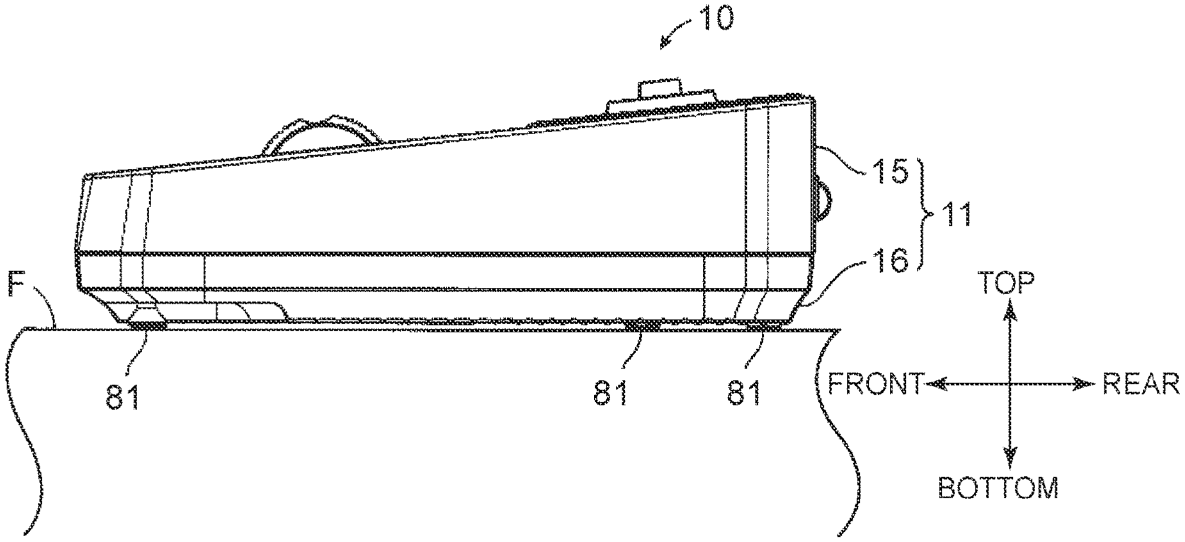
FIG. 11 is a side view illustrating one example of the electronic keyboard instrument in FIG. 1A.

FIG. 11 is a side view illustrating one example of the electronic keyboard instrument 10. As illustrated in FIG. 11, in addition to FIG. 10, the case 11 includes a plurality of legs 81 which projects from a lower face of the second case 16. Owing to installation of the legs 81, in a case where the electronic keyboard instrument 10 is put on a predetermined flat installation face F, it becomes possible to form a gap between the installation face F and the lower face of the second case 16.

In the above-described configuration, in a case where the sounds are released from the loudspeakers 13 by the operation of playing the keyboard 12 and so forth, the sounds are released from the upper-face side which is the sound emission face side of each loudspeaker 13 in the first direction D1 as illustrated in FIG. 9A. In addition, the bass which resonates in the acoustic space 51 simultaneously with releasing of the sounds is released from a lower face of the cone part of each loudspeaker 13, passes through the bass reflex duct 61 and is then released in the second direction D2 through the sound holes 62.

Incidentally, as illustrated in FIG. 11, since the legs 81 are installed on the lower face of the second case 16 so as to form the gap between the installation face F and the lower face of the second case 16, the sound holes 62 are not blocked and it becomes possible to release the sounds to the outside through the sound holes 62.

According to one embodiment, as illustrated in FIG. 2B, owing to installation of the board component 60 which functions as the sound releasing member in the second region S2 which faces the rear face of the internal component 21, it becomes possible to release the sounds through the sound holes 62 which are positioned so as not to be superposed on (bot to face) the first region S1 which faces the rear face of the loudspeaker 13. Thereby, even in a case where a top-bottom width of the case 11 is reduced, it becomes possible to elongate a distance between the sound holes 62 and the rear face of the loudspeaker 13 and then it becomes possible to preferably emit the bass while reducing the top-bottom width of the case 11. In the electronic keyboard instrument 10 according to one embodiment, it becomes possible to simultaneously attain downsizing of the entire electronic keyboard instrument 10 and sound quality improvement of the bass which would otherwise fall into a trade-off relation in this way.

In addition, owing to fixing of the board component 60 to the second case 16, it becomes possible to form part of the bass reflex duct 61 by the simple configuration and then it becomes possible to promote the sound quality improvement of the bass.

Further, as illustrated in FIG. 9 and so forth, since the bass reflex duct 61 is formed also including the inner face of the base part 43 in the second case 16, it becomes possible to decrease the number of components used for forming the bass reflex duct 61.

In addition, in one embodiment, since the first to third fixing portions 69 to 71 are disposed as illustrated in FIG. 4, it becomes possible to select the board component 60 of the first length L1 or the board component 60A of the second length L2 and to attach the selected board component to the second case 16 by using the first to third fixing portions 69 to 71. In other words, it becomes possible to change the left-right direction length of the bass reflex duct 61 with addition of the first length L1 or the second length L2 by making it possible to select one of the two board components 60 and 60A. Thereby, it becomes possible to adjust the length of the bass reflex duct 61 in accordance with the performance of the loudspeakers 13 to be loaded and it becomes possible to make the sound quality of the bass more preferable.

Further, since the plurality of sound holes 62 which is arrayed in the left-right direction and the front-rear direction is formed in the bottoms of the plurality of U-shaped grooves 75, it becomes possible to reduce an opening area of each sound hole 62. Thereby, it becomes possible to prevent large-sized dust and dirt from intruding into the case 11 from the outside through the sound holes 62.

In addition, since the plurality of U-shaped grooves 75 is disposed so as to extend along the direction that the sounds are released in the acoustic space 51, it becomes possible to more preferably promote the sound quality improvement of the bass.

In addition, owing to installation of the reinforcement ribs 77 which extend in the left-right direction, it becomes possible to promote improvement of strength of the region that the plurality of sound holes 62 is formed. Further, since also the reinforcement ribs 77 extend along the direction that the sounds are released in the acoustic space 51 similarly to the U-shaped grooves 75, it becomes possible to more preferably promote the sound quality improvement of the bass.

Further, since the bass reflex duct 61 which includes the board component 60 is installed between two loudspeakers 13, it becomes unnecessary to increase a left-right width of the case 11 while making it possible to emit the preferable bass by installation of the bass reflex duct 61. Therefore, it becomes possible to avoid upsizing of the case 11 by the amount that the bass reflex duct 61 is installed and, in addition, it becomes possible to promote the sound quality improvement of the bass.

In addition, according to one embodiment, since the extended region 24 on the outer side of which the internal component 21 is disposed is formed on the intermediate member 20, it becomes possible to expand the space which is formed under the internal component 21 as the acoustic space 51. Thereby, it becomes possible to avoid upsizing of the case 11 in the left-right direction and the front-rear direction and, in addition, it becomes possible to form the preferable acoustic space 51 which is expanded in the left-right direction. In the electronic keyboard instrument 10 according to one embodiment, it becomes possible to simultaneously attain downsizing of the entire electronic keyboard instrument 10 and formation of the preferable acoustic space 51 which would otherwise fall into the trade-off relation in this way.

Here, in one embodiment, the internal component 21 is disposed in the region which is closer to a left-right direction central portion of the entire keyboard 12 than to the main region 23 and thereby it becomes possible to dispose the internal component 21 in the outer space which is located above the extended region 24. Accordingly, it becomes possible to form the extended region 24 by utilizing the space which is located more inward than the loudspeaker 13 in the left-right direction and under the various internal components 21 in the electronic keyboard instrument 10 and thereby it becomes possible to realize both the downsizing of the entire electronic keyboard instrument 10 and the formation of the preferable acoustic space 51.

In addition, in one embodiment, it is possible to form the acoustic space 51 by fixing the intermediate member 20 to the second case 16 in a state which is obtained before the second case 16 is combined with the first case 15 and which is illustrated in FIG. 1B. Accordingly, in comparison with a configuration that the acoustic space is formed by combining the second case 16 with the first case 15, it becomes possible to form the preferable acoustic space 51 more simply by configuring as described above in accordance with one embodiment. Moreover, it becomes possible to perform an acoustic test by forming the acoustic space 51 in a state where the first case 15 is separated from the second case 16. Thereby, it becomes possible to perform post-acoustic-test adjustment with no need of attachment/detachment of the first case 15 to/from the second case 16 and then it becomes possible to promote a reduction in burden on the adjustment.

Further, since the intermediate member 20 has the sound releasing hole 26*a* at the position which faces the loudspeaker 13, it becomes possible to release the sounds from the upper face of the loudspeaker 13 in the first direction D1. Here, it is possible to set the left-right direction of also the sound releasing hole 26*a* as the longitudinal direction together with the intermediate member 20 and the loudspeaker 13 and thereby it becomes possible to contribute to a reduction in front-rear width of the case 11.

In addition, as illustrated in FIG. 7, the intermediate member 20 has the fixing hole 39 and the fixing hole boss 41 in which the fixing hole 39 is formed is brought into a state of being sandwiched between the downward facing boss 15*a* of the first case 15 and the case fixing boss 46 of the second case 16 by fastening together the first case 15 and the second case 16 with the screw 52. In other words, owing to fastening with the screw 52 which fixes together the first case 15 and the second case 16, it becomes possible to fix the intermediate member 20 around the fixing hole 39 and thereby it becomes possible to preferably fix the intermediate member 20.

Further, since in the intermediate member 20, the main region 23 is formed higher than the extended region 24 in top-bottom height, it becomes possible to dispose the extended region 24 under the internal component 21 with ease while ensuring the space for housing the loudspeaker 13 in the main region 23. Thereby, it becomes possible to form the preferable acoustic space 51 in the intermediate member 20.

In addition, since the intermediate member 20 has the front side wall 27, the rear side wall 28, the outer side wall 31 and the rib side wall 34, it becomes possible to form the intermediate member 20 into the box-shape and thereby it becomes possible to form the acoustic space 51 having a predetermined volume with the aid of the box-shaped intermediate member 20. Moreover, it becomes possible to increase rigidity of the intermediate member 20 itself and thereby the intermediate member 20 also functions as a reinforcement member which reinforces the case 11.

Further, since the inclined portion 36 is formed at the boundary between the main region 23 and the extended region 24, it becomes possible to expand the acoustic space 51 between the intermediate wall 30 and the upper wall 33 as illustrated in FIG. 9A. Moreover, the inclined portion 36 is oriented so as to follow the flow of the acoustics which is indicated by a broken line in FIG. 9A and thereby it becomes possible to preferably transmit the acoustics in the acoustic space 51 on the main region 23 side to the extended region 24 side via the inclined part 36.

Here, in the state in FIG. 5B, since the attachment hole boss 40 which is positioned so as to be superposed on the inclined part 36 has the semicircular arc-shaped outer circumference surface on its inner side, it becomes possible to preferably transmit the acoustics in the acoustic space 51 on the main region 23 side to the extended region 24 side also via the attachment hole boss 40 which is shaped in this way.

In addition, the front-rear direction length of the intermediate member 20 is made shorter than the left-right direction length thereof and thereby it becomes possible to reduce the front-rear direction sizes of the intermediate member 20 and eventually the entire electronic keyboard instrument 10.

Incidentally, the present disclosure is not limited to one embodiment and it is possible to embody the present disclosure by modifying in a variety of ways. In one embodiment, the sizes, the shapes, the directions and so forth are not limited to those which are illustrated in the appended drawings and it is possible to appropriately change the sizes, the shapes, the directions and so forth within the range that effects of the present disclosure are exhibited. In other respects, it is possible to embody the present disclosure by appropriately modifying in the variety of ways within a range not deviating from the intended scope of the present disclosure.

Although, in one embodiment, the sound releasing member is configured by the board component 60, 60A, the components to be used are not limited to the board components 60 and 60A, various modifications are possible as long as the component concerned is capable of configuring at least part of the bass reflex duct 61.

For example, the bass reflex duct 61 may be configured by forming the sound releasing member which functions as a component which corresponds to the board component 60, 60A not separately from the second case 16 but integrally with the second case 16. In addition, the bass reflex duct 61 may be also configured such that the sound releasing member which functions as the component which corresponds to the board component 60, 60A is formed integrally with the first case 15 and is formed into a duct shape in a state where the first case 15 and the second case 16 are combined with each other. Further, in the bass reflex duct 61, the top-bottom height of the duct rib 63 may be made high and the three-sided wall 66 of the board component 60, 60A may be eliminated and thereby a flat board member may be formed as the sound releasing member.

In addition, the sound releasing member may be configured by a passive radiator in place of the bass reflex duct 61.

The passive radiator may be installed in the region that the sound holes 62 are formed, in place of the base part 43 in the second case 16. Owing to installation of the passive radiator, it becomes possible to more preferably prevent intrusion of the dust and dirt into the second case 16 from the lower face side of the second case 16 while making it possible to release the bass in the second direction D2.

In addition, the size, the number to be formed and the shape of the sound holes 62 are not limited to those which are described in relation to one embodiment and may be changed as long as it is possible to release the sounds in the same manner as the above.

Although, in one embodiment, an example that the electronic musical instrument is the electronic keyboard instrument 10 is described, the electronic musical instrument is not limited to the electronic keyboard instrument. The electronic musical instrument may be a musical instrument which emits sounds in accordance with the operation of the user and may be an electronic violin, an electric guitar, an electronic drum, electronic brass instruments and so forth, in addition to other keyboard instruments.

Accordingly, the "keyboard 12" in one embodiment may be replaced with a playing operator for pitch designation such as a string, a valve and so forth, an optional playing operator and so forth.

Incidentally, a term which is described in the preset disclosure and/or a term which is necessary for understanding of the present disclosure may be replaced with another term which is the same as or similar to the above-described term in meaning.

Each form/embodiment which is described in the present disclosure may be used alone, may be used by combining with another/other form(s)/embodiment(s), and may be used by switching from one form/embodiment to another form/embodiment in association with execution of an operation.

Any reference to elements which are used by adding designations such as "the first", "the second" and so forth which are used in the present disclosure does not generally limit the amounts or the order of those elements. These designations would be used in the present disclosure as a convenient method of making a distinction between/among two or more elements. Accordingly, reference to the first and second elements does not mean that only two elements would be adopted or it is necessary to use the first element antecedently to the second element in some form or other.

What is claimed is:

1. An electronic musical instrument comprising:
- a loudspeaker which releases sounds in a first direction in accordance with an instrument playing operation;
- an internal component which includes a substrate;
- a case which houses the loudspeaker and the internal component and has a first region which faces a rear face of the loudspeaker and a second region which faces a rear face of the internal component and does not face the rear face of the loudspeaker, wherein the case includes a first case and a second case;
- a sound releasing member which is disposed on an installation face side of the case and in the second region, and releases acoustics in an acoustic space which is formed around the loudspeaker in a second direction which is opposite to the first direction; and
- an intermediate member which houses the loudspeaker therein, wherein the intermediate member has a fixing hole for mutually fixing the first case, the second case, and the intermediate member.

2. The electronic musical instrument according to claim 1, wherein the sound releasing member includes either at least part of a bass reflex duct or a passive radiator.

3. The electronic musical instrument according to claim 2, wherein the case has a first fixing part which at least fixes one board component of the sound releasing member which has a first length as a length which is measured in a longitudinal direction of the bass reflex duct and a second fixing part which fixes another board component which has a second length which is shorter than the first length as a length which is measured in the longitudinal direction of the bass reflex duct.

4. The electronic musical instrument according to claim 2, wherein the case has:
- a plurality of U-shaped grooves which extend in a longitudinal direction of the bass reflex duct on the installation face side, and
- a plurality of sound holes which are arrayed in a transverse direction and the longitudinal direction of the bass reflex duct and function as bass reflex ports in bottoms of the plurality of U-shaped grooves in the second region.

5. The electronic musical instrument according to claim 4, wherein a reinforcement rib which extends in the longitudinal direction of the bass reflex duct is disposed on each lateral portion between every two mutually adjacent grooves of the plurality of U-shaped grooves in the second region.

6. The electronic musical instrument according to claim 1, wherein:
- the intermediate member is disposed in the case and houses the loudspeaker therein and forms the acoustic space by being fixed to the case, and
- the intermediate member has a region in which the loudspeaker is disposed and a region on an outer side of which the internal component is disposed.

7. The electronic musical instrument according to claim 6, wherein in the intermediate member, a height from a bottom face to a top face of the region in which the loudspeaker is disposed is higher than a height from a bottom face to a top face of the region on the outer side of which the internal component is disposed.

8. The electronic musical instrument according to claim 6, wherein the intermediate member has a sound releasing hole in the region in which the loudspeaker is disposed.

9. The electronic musical instrument according to claim 6, wherein the intermediate member has a side wall part which extends from an outer edge of a top face to a bottom face of each of the region in which the loudspeaker is disposed and the region on the outer side of which the internal component is disposed.

10. The electronic musical instrument according to claim 6, wherein the intermediate member has an inclined part at a boundary between the region in which the loudspeaker is disposed and the region on the outer side of which the internal component is disposed.

11. An electronic musical instrument comprising:
- a loudspeaker which releases sounds in a first direction in accordance with an instrument playing operation;
- a case which houses the loudspeaker and has a plurality of sound holes which function as bass reflex ports which release acoustics in an acoustic space which is formed around the loudspeaker in a second direction which is opposite to the first direction, in a second region which does not include a first region which faces a rear face of the loudspeaker, wherein the case includes a first case and a second case;

a board component which is fixed to the case in the second region and forms a bass reflex duct together with an inner wall of the case, wherein the bass reflex duct is arranged such that the acoustics in the acoustic space pass through the bass reflex duct and then are released outside the case through the bass reflex ports; and an intermediate member which houses the loudspeaker therein, wherein the intermediate member has a fixing hole for mutually fixing the first case, the second case, and the intermediate member.

12. The electronic musical instrument according to claim 11, wherein the case has a first fixing part which at least fixes, as the board component, a first board component which has a first length as a length which is measured in a longitudinal direction of the bass reflex duct and a second fixing part which fixes, as the board component, a second board component different from the first board component and which has a second length which is shorter than the first length as a length which is measured in the longitudinal direction of the bass reflex duct.

13. The electronic musical instrument according to claim 11, wherein:

the intermediate member is disposed in the case and houses the loudspeaker therein and forms the acoustic space by being fixed to the case, and the intermediate member has a region in which the loudspeaker is disposed and a region on an outer side of which an internal component including a substrate is disposed.

14. The electronic musical instrument according to claim 13, wherein in the intermediate member, a height from a bottom face to a top face of the region in which the loudspeaker is disposed is higher than a height from a bottom face to a top face of the region on the outer side of which the internal component is disposed.

15. The electronic musical instrument according to claim 13, wherein the intermediate member has a sound releasing hole in the region in which the loudspeaker is disposed for releasing the sounds released by the loudspeaker in the first direction.

16. The electronic musical instrument according to claim 13, wherein the intermediate member has a side wall part which extends from an outer edge of a top face to a bottom face of each of the region in which the loudspeaker is disposed and the region on the outer side of which the internal component is disposed.

17. The electronic musical instrument according to claim 13, wherein the intermediate member has an inclined part at a boundary between the region in which the loudspeaker is disposed and the region on the outer side of which the internal component is disposed.

18. The electronic musical instrument according to claim 11, wherein the case has:

a plurality of U-shaped grooves which extend in a longitudinal direction of the bass reflex duct on an installation face side of the case, and the plurality of sound holes which are arrayed in a transverse direction and the longitudinal direction of the bass reflex duct and function as the bass reflex ports in bottoms of the plurality of U-shaped grooves in the second region.

19. The electronic musical instrument according to claim 18, wherein a reinforcement rib which extends in the longitudinal direction of the bass reflex duct is formed on each lateral portion between every two mutually adjacent grooves of the plurality of U-shaped grooves in the second region.

20. An electronic keyboard instrument comprising:

a keyboard;

a plurality of loudspeakers which releases sounds in a first direction in accordance with an instrument playing operation;

a case which houses therein at least the plurality of loudspeakers; and a plurality of sound releasing members which are disposed on an installation face side of the case and between the plurality of loudspeakers and release acoustics in respective acoustic spaces which are formed around the plurality of loudspeakers respectively in a second direction which is opposite to the first direction, wherein the plurality of loudspeakers are arranged rearward of the keyboard in a front-rear direction perpendicular to an array direction of keys of the keyboard such that, when viewed from a top-bottom direction perpendicular to the front-rear direction and the array direction, the plurality of loudspeakers and the keyboard do not overlap.

* * * * *